(12) United States Patent
Bermudez et al.

(10) Patent No.: US 6,874,149 B1
(45) Date of Patent: Mar. 29, 2005

(54) HOOKING OF REPLACEMENT AND AUGMENTED API FUNCTIONS

(75) Inventors: Gerardo Bermudez, Redmond, WA (US); Gerald P. Shea, Duvall, WA (US); Jeffrey E. Stall, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 448 days.

(21) Appl. No.: 09/605,272

(22) Filed: Jun. 28, 2000

(51) Int. Cl.$^7$ .................................................. G06F 9/00
(52) U.S. Cl. ..................................................... 719/328
(58) Field of Search ........................... 719/328; 709/328

(56) References Cited

U.S. PATENT DOCUMENTS

| | | | | |
|---|---|---|---|---|
| 5,899,987 A | * | 5/1999 | Yarom ............................. | 707/3 |
| 5,903,269 A | * | 5/1999 | Poreh et al. .................. | 345/804 |
| 5,990,907 A | * | 11/1999 | Colletti ........................ | 345/467 |
| 6,304,881 B1 | * | 10/2001 | Halim et al. ................. | 707/201 |
| 6,314,470 B1 | * | 11/2001 | Ward et al. .................. | 709/328 |
| 6,412,071 B1 | * | 6/2002 | Hollander et al. ........... | 713/200 |
| 6,463,583 B1 | * | 10/2002 | Hammond .................... | 717/162 |

OTHER PUBLICATIONS

John Shapley Gray, Interprocess Communication in Unix, Prentive Hall PFT, 1998, Chapter, 6, 6.3 to 6.5.*
IIBM, Memory Leak Detection, Oct. 1, 1992, p. 1–2.*
John Shapley Gray, Interprocess Communication in Unix, Prentice Hall PTR, 1998, Chapter, 6, 6.3 to 6.5.*

* cited by examiner

*Primary Examiner*—Meng-Al T. An
*Assistant Examiner*—LeChi Truong
(74) *Attorney, Agent, or Firm*—Merchant & Gould

(57) ABSTRACT

Hooking replacement and augmented API functions is disclosed. In one embodiment, an alternative implementation of one or more API functions is hooked into the operating system through utilization of a replacement API table. The functions that have been replaced, augmented, or otherwise modified have entries in the table pointing to their new implementation. The entries for functions that have not been change continue to point to their existing implementation. A bit array is also disclosed to track desired messages, as compared to undesired messages, where each bit of the array corresponds to a type of message. The table can be variably sized, and can support nested and re-entrant calls.

9 Claims, 4 Drawing Sheets

HOOKING OF REPLACEMENT AND AUGMENTED API FUNCTIONS

FIELD OF THE INVENTION

This invention relates generally to application programming interface (API) functions, and more particularly to the utilization of replacement and augmented API functions instead of corresponding default API functions.

BACKGROUND OF THE INVENTION

Currently, the look, feel, and behavior of the user interface for some operating systems are integrated within the core of the operating systems itself. Changing the user interface, therefore, requires upgrading the operating system. However, there is a good reason to integrate the user interface very tightly with an operating system—it yields a high performance, stable, and robust user interface.

Typically, the user interface, like other aspects of an operating system, is exposed to applications through application programming interfaces (API's). In many operating systems, there are two types of memory, unprotected memory, such as what is known as user mode memory, and protected memory, such as what is known as kernel mode memory. Having protected memory helps ensure the stability and security of the operating system itself. Therefore, the API functions for features of the operating system, such as the user interface, are typically implemented within the protected memory.

There are many different existing approaches to changing the implementation of API's. The existing implementation may itself be changed. However, if these API's are implemented in kernel mode, the cost of developing, testing and debugging these changes can outweigh the benefit the new features provide. Kernel mode changes, in general, are not desirable. Furthermore, changing the implementation of an API can cause existing applications to stop working correctly, due to changes in behavior. This situation could adversely affect backward compatibility with previous versions of the operating system. Another approach is to introduce new API's, corresponding to new features and functionality. However, for the user interface in particular, this is an undesirable solution. Since most applications call many user interface API's, they would have to be significantly changed to utilize the new API's. Furthermore, customers may be required to upgrade their applications along with the operating system to take advantage of the new features and functionality. Other approaches have similar and additional disadvantages. For these and other reasons, therefore, there is a need for the present invention.

SUMMARY OF THE INVENTION

The invention relates to hooking replacement API functions. In one embodiment, an alternative implementation of one or more API functions is hooked into the operating system by utilizing a replacement API table. The functions that have been replaced, augmented, or otherwise modified have entries in the table pointing to their new implementation. The entries for functions that have not been changed continue to point to existing implementations.

The invention provides for advantages over the prior art. API hooking allows a component such as an unprotected memory dynamically linked library (DLL) to provide an alternative implementation to an API function, without requiring existing applications to be recompiled. The alter native implementation can provide new functionality, and then delegate to the existing implementation to provide the remaining functionality, for example. Embodiments of the invention can be utilized to add additional user interface features to an operating system, such as allowing for new user interface themes. However, the invention is not limited to user interface applications.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the present invention is defined only by the appended claims.

Utilization of a Replacement API Table to Allow API Hooking

Figure 1:
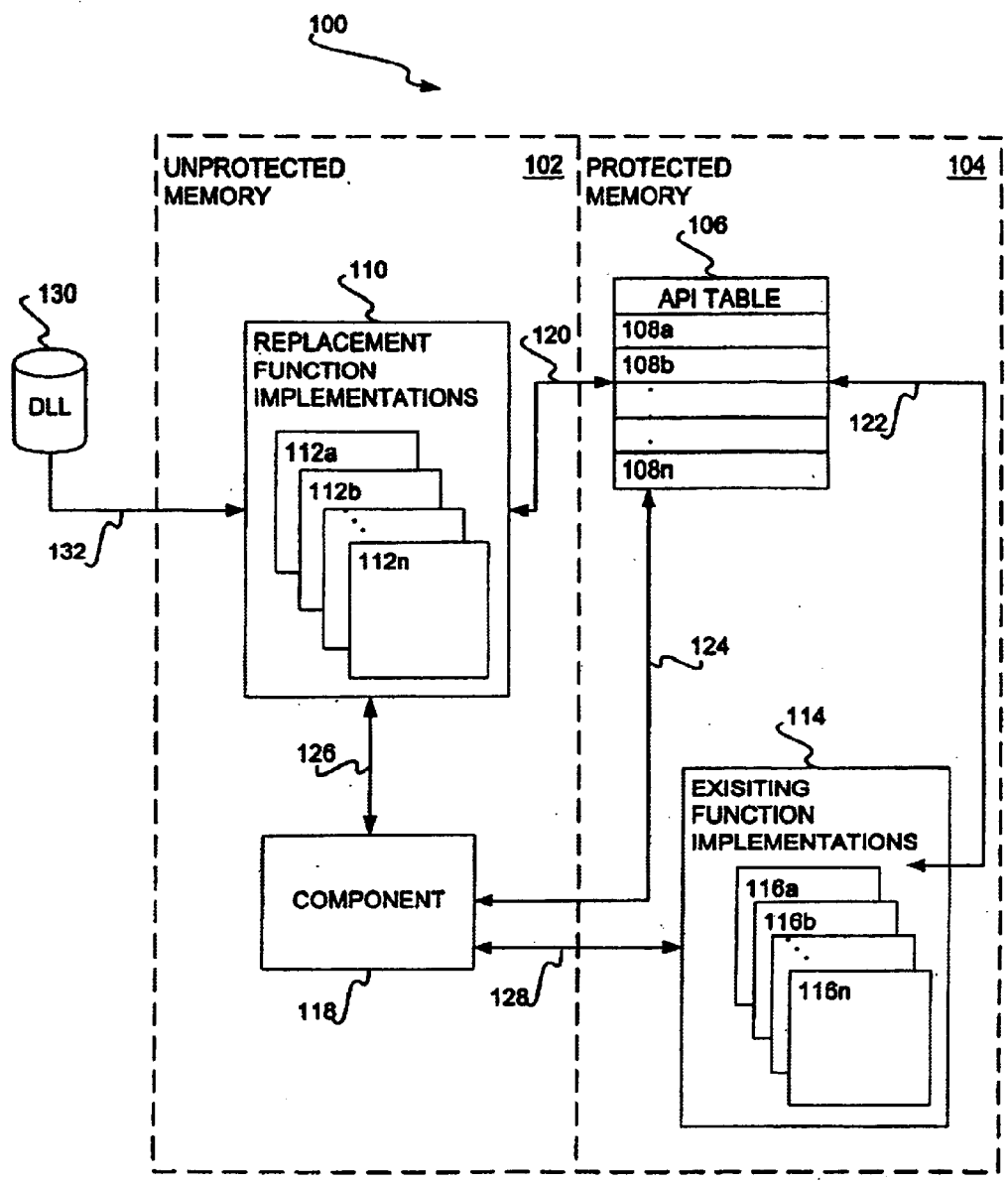
FIG. 1 is a diagram of a system according to an embodiment of the invention.

In FIG. 1, a diagram of a system 100 according to an embodiment of the invention is shown. The system 100 is divided into unprotected memory 102 and protected memory 104. The unprotected memory 102 can in one embodiment be what is known in the art as user mode memory. The protected memory 104 can in one embodiment be what is known in the art as protected mode memory. However, the invention is not so limited.

Within the protected memory 104 is a replacement API table 106. The API table 106 has a number of entries 108a, 108b, . . . , 108n. Each entry has a pointer to a corresponding function, either to an existing implementation of an API function, or to a replacement implementation of an API function. The replacement implementations reside in replacement function implementations 110 in the unprotected memory 102. For example, replacement function implementations 110 include a number of replacement function implementations 112a, 112b, . . . , 112n, such that one or more of the entries 108a, 108b, . . . , 108n point thereto, as indicated by the line 120. The existing implementations reside in existing function implementations 114 in the protected memory 104. For example, existing function implementations 114 include a number of existing function implementations 116a, 116b, ..., 116n, such that one or more of the entries 108a, 108b, ..., 108n point thereto, as indicated by the line 122.

In one embodiment, the API table 106 is replaced to have one or more of its entries point to the replacement function implementations 110 as described later in the detailed description. The replacement functions can add pre-processing functionality to the original existing functions, add post-processing functionality, add both pre- and post-processing functionality, or totally replace the original existing functions. For example, one or more of the replacement function implementations 110 first can perform some pre-processing, then call the original existing function implementation within the existing function implementations 114, and then perform some post-processing.

Thus, when a component 118, such as a computer program, thread, process, etc., needs to call an API function, it references the API function within the API table 106, as referenced by the line 124. Specifically, the component 118 references a particular entry within the table 106. The entry points the component 118 to either one of the replacement function implementations 10, or one of the existing function implementations 114. Therefore, the component 118 calls one of the former function implementations, as referenced by the line 126, or one of the latter function implementations, as referenced by the line 128.

Note that without the replacement function implementations 110, all of the pointers within the API table 106 would point to the existing function implementations 114. Because the API table 106 is a replacement table that has been modified to have at least some of its entries point to the replacement function implementations 10, the component 118 may end up calling some of these replacement function implementations 110. This is how embodiments of the invention provide for additional operating system functionality without requiring recompiling of the component 118, or adding new API functions.

In one embodiment, the replacement function implementations 110 originally reside within a file 130, such as a dynamically linked library (DLL) file. Once the replacement function implementations 110 have been hooked into the API table 106, the API table 106 has been modified as it is shown in FIG. 1, pointing to both replacement function implementations 110 as well as existing function implementations 114. Thereafter, when one of the function implementations 110 is first called, the implementations 110 are at that time loaded into the unprotected memory 102. This is shown by the line 132. However, the invention is not so limited. For example, as soon as the replacement function implementations 110 have been hooked into the API table 106, they can immediately be loaded from the file 130 into the unprotected memory 102, in another embodiment of the invention.

Figure 2:
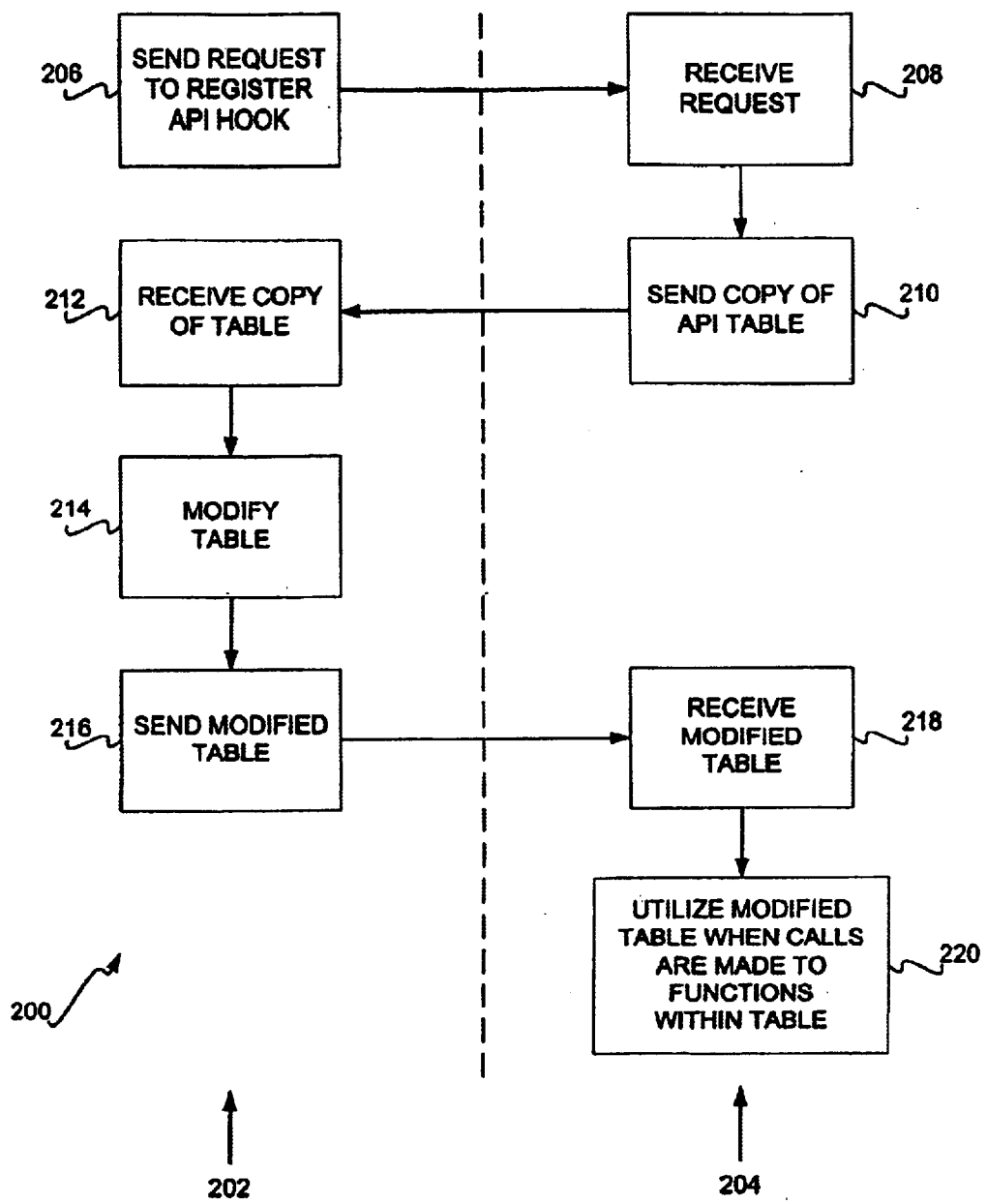
FIG. 2 is a flowchart of a method according to an embodiment of the invention.

The manner by which the replacement API function implementations 110 are hooked into the API table 106 is shown by reference to FIG. 2, which is a flowchart of a method 200 according to an embodiment of the invention. The method 200 is performed by two separate components, where the parts of the method 200 within the column 202 are performed by a first hooker component typically residing in unprotected memory, and the parts of the method 200 within the column 204 are performed by a second hooker component typically residing in protected memory. These hooker components are not specifically shown in the diagram of FIG. 1, it is noted. The first hooker component modifies the API table so that it includes pointers to the replacement function implementations, and is particular to a given set of replacement function implementations. Furthermore, in one embodiment, the first hooker component is external to the operating system, and can be the application program that desires to provide the replacement API's. The second hooker component provides the API table to the first hooker component and then ensures that the modified API table will be utilized. The second hooker component is not particular to any given set of replacement function implementations, and rather is a part of the operating system itself. That is, the second hooker component is the part of the operating system that receives and processes the request to change API's from the first hooker component.

In 206, a request is sent to register an API hook of replacement API function implementations into an API table. The request is received in 208, and in response, a copy of the existing API table is sent in 210. The existing API table has pointers to the existing API function implementations, such as the existing function implementations 114 of FIG. 1. The copy of the existing API table is received in 212, and is modified in 214. The modifications in 214 are accomplished so that one or more of the pointers within the API table are made to point to the replacement API function implementations, such as the replacement function implementations 110 of FIG. 1. This modified copy of the API table is then sent back in 216, and received in 218. Thereafter, in 220, the modified table is used when calls are made to the functions referenced within the table.

It is noted that in one embodiment, the requesting and processing of the API hooking is performed as a two-part process. First, the request is made, and then validated. The request can be accepted or rejected. If accepted, the operating system stores the identifier of a module that contains the replacement API's, and initializes any needed internal information in preparation for API replacement. The second part is executed later, on demand, and occurs on every process that attempts to use any of the API's that are to be hooked. In this part, the operating system loads the module, calling into to the module to pass the API table to be modified. Thus, the replacement API table is not loaded unless it is needed. The two parts can also occur in different processes. Furthermore, as can be appreciated by those of ordinary skill within the art, the loading that has been described can occur synchronously as to every process, or asynchronously on demand, as has been particularly described.

In addition, it is noted that in one embodiment of the invention, the API table contains information regarding its size. This can allow the operating system to increase the table as needed for future version thereof, without causing incompatibility problems with existing applications. Furthermore, this can allow applications to operate correctly in different versions of the operating system that support replacement API tables.

Thus, the method 200 of FIG. 2 is the process by which replacement API function implementations can be hooked into an API table. It is noted that some of the pointers within the API table can, and most likely will, remain pointing to the existing API AU function implementations. That is, the replacement API function implementations do not have to completely replace the existing API function implementations. Rather, the former can selectively determine which of the existing API function implementations it replaces. Moreover, the existing API function implementations can themselves be called by the replacement API function implementations. This would be desirable, for example, where augmented functionality is desired to be added to existing functionality, instead of replacing the existing functionality.

As can be appreciated by those of ordinary skill within the art, modifications and extensions can be made to the method 200 of FIG. 2 without departing from the spirit or scope of the invention. For example, when the request to register an API hook is made in 206, it can be determined whether the originator of this request has permission to register the API hook as desired before allowing the originator to do so. This allows for additional security, so that malicious programs without proper authorization cannot register API hooks. Furthermore, not shown in FIG. 2 is that the method 200 can also include the unregistering of the API hook, such that the API table that has been modified is returned to its former state. That is, the API table utilized for referencing API function calls after registration is that which points to the existing API function implementations only as before, and not to any replacement API function implementations. Further and other modifications and extension can be made to the method of FIG. 2 as well.

The manner by which the replacement API table is utilized is described by reference to FIG. 3, which is a flowchart of a method 300 according to another embodiment of the invention. It is noted, however, that the invention itself is not limited to the method 300. In 302, a call is originated to a desired function referenced in a replacement API table. The replacement API table has a number of entries corresponding to API functions, where some of the entries can point to replacement API function implementations, and other of the entries can point to existing API function implementations. In 304, the pointer of the API table entry for the desired function is looked up, and is utilized in 306. This pointer, therefore, could be to a replacement API function implementation, or to an existing API function implementation.

Figure 3:
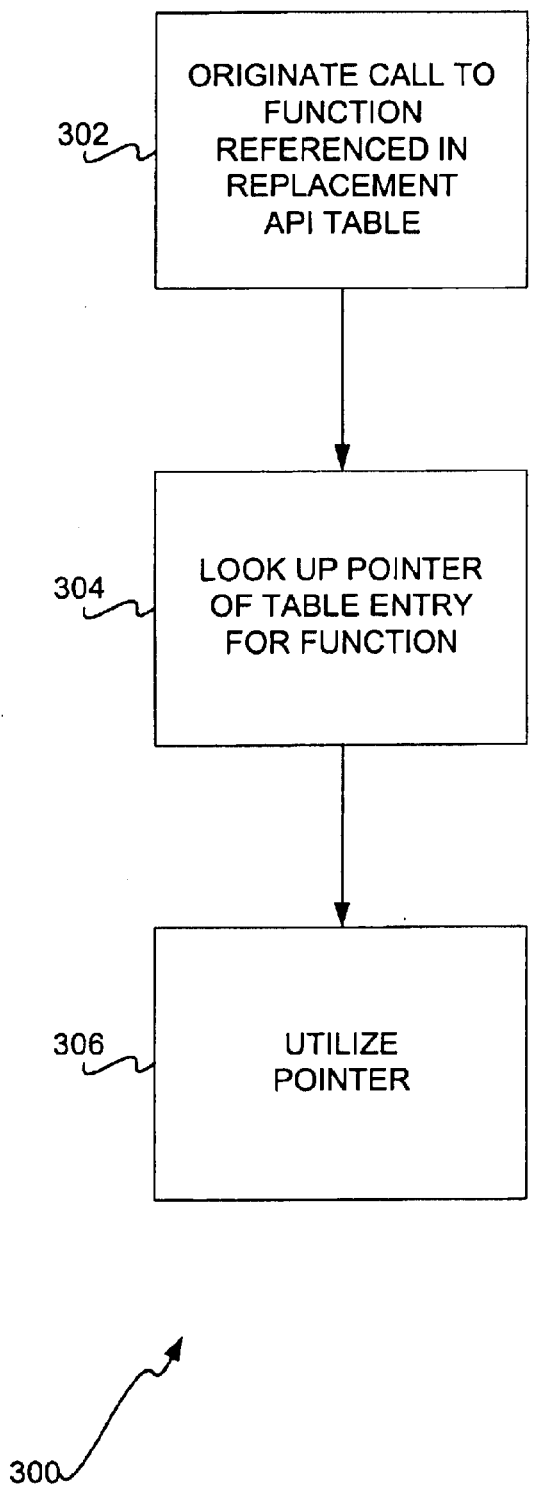
FIG. 3 is a flowchart of another method according to an embodiment of the invention; and, FIG. 4 is a diagram of an example computer computerized device in conjunction with which embodiments of the invention can be practiced.

The method of FIG. 3 creates a desired level of isolation between the existing API implementation and the specifics of the hooking mechanism. For example, the function pointer look-up can operate in the same manner, regardless of whether a replacement API has been provided. Similarly, the existing API implementation behaves the same way when called from the applications directly or when called from replacement API's. This isolation results in higher maintainability for the operating system API's, since they are not affected by the replacement API's. Furthermore, it can also guarantee that the mechanism works independently of the specifics of the replacement API's.

It is noted that various housekeeping flags and counters can be kept track of in order to implement embodiments of the invention, although the invention itself is not so limited to the flags and counters described herein. For example, there can be a registered flag and an unregistered flag. The registered flag can be set when the API hook is first registered. Thereafter, when a call is made to one of the replacement API function implementations for the first time (or, in another embodiment, to any of the function implementations within the replacement API table, including the existing API function implementations, for the first time), if the registered flag is set, then the replacement API function implementations are loaded. The unregistered flag can be set when the API hook is desired to be unregistered, by calling an appropriate unregistering function, for example. Thereafter, when the last component, such as the last thread, process, program, etc., that is in one of the functions of the API table exits the function, if the unregistered flag is set, the replacement API function implementations are unloaded.

Two counters can also be kept track of in one embodiment, so that the invention can operate in multi-threaded applications, and to manage the situation where API's can be re-entered or nested-called. For example, while processing an API, the operating may call back into the application, and during that callback, the application may call the same API (re-entering) or may call another API (nested call). The counters include a load counter, and a call counter. The load counter indicates the number of times the loading mechanism (which can be generically referred to as a component) has been triggered in the current process. The replacement API function implementations are actually loaded only once, and are unloaded only when the load counter reaches zero. That is, one component may decrement the load counter to indicate that it no longer needs the replacement API function implementations; however, they are not actually unloaded until no other component needs them. The call counter indicates the number of current components that are executing one of the replacement API function implementations. Similarly, the replacement API function implementations are not unloaded until all of the replacement API function implementations currently executing have been returned from—that is, all of them have been exited. These counters can be used in conjunction with or in lieu of the flags described in the previous paragraph.

Furthermore, in one embodiment, the replacement API table can be different for every hooked process. This allows for different user interface (UI) look, feel, and behavior for each process. For example, only one process may have its API's hooked, such that the API table is not modified for any other process. The former process, in the case where the API's are UI API's, could thus have a different UI look, feel, and behavior, as compared to the latter processes.

Finally, in one embodiment, a bit array is used to indicate which types of messages are desired to be kept track of. For example, especially in the case of user interface replacement API functionality, there can be a number of different messages that the operating system inherently keeps track of. Rather then sending each event corresponding to a new message to the replacement API function implementations, only those events corresponding to messages that are of types that have their corresponding bits set in the bit array are sent. This provides for increased performance, since the API function implementations are only called when a desired event occurs, instead of for all events. The bit array is in one embodiment a array of one-bit bits, where each bit can be set to zero to indicate that the message type corresponding thereto is not desired to be listened to, or one to indicate that the message type corresponding thereto is desired to be listened to.

Example Computer and Computerized Device

The system of the previous section of the detailed description can be implemented over one or more computers or computerized devices. In this section of the detailed description, an example computer or computerized described is described. However, the invention is not limited to this description, and this description is provided for illustrative purposes only, as can be appreciated by those of ordinary skill within the art.

Figure 4:
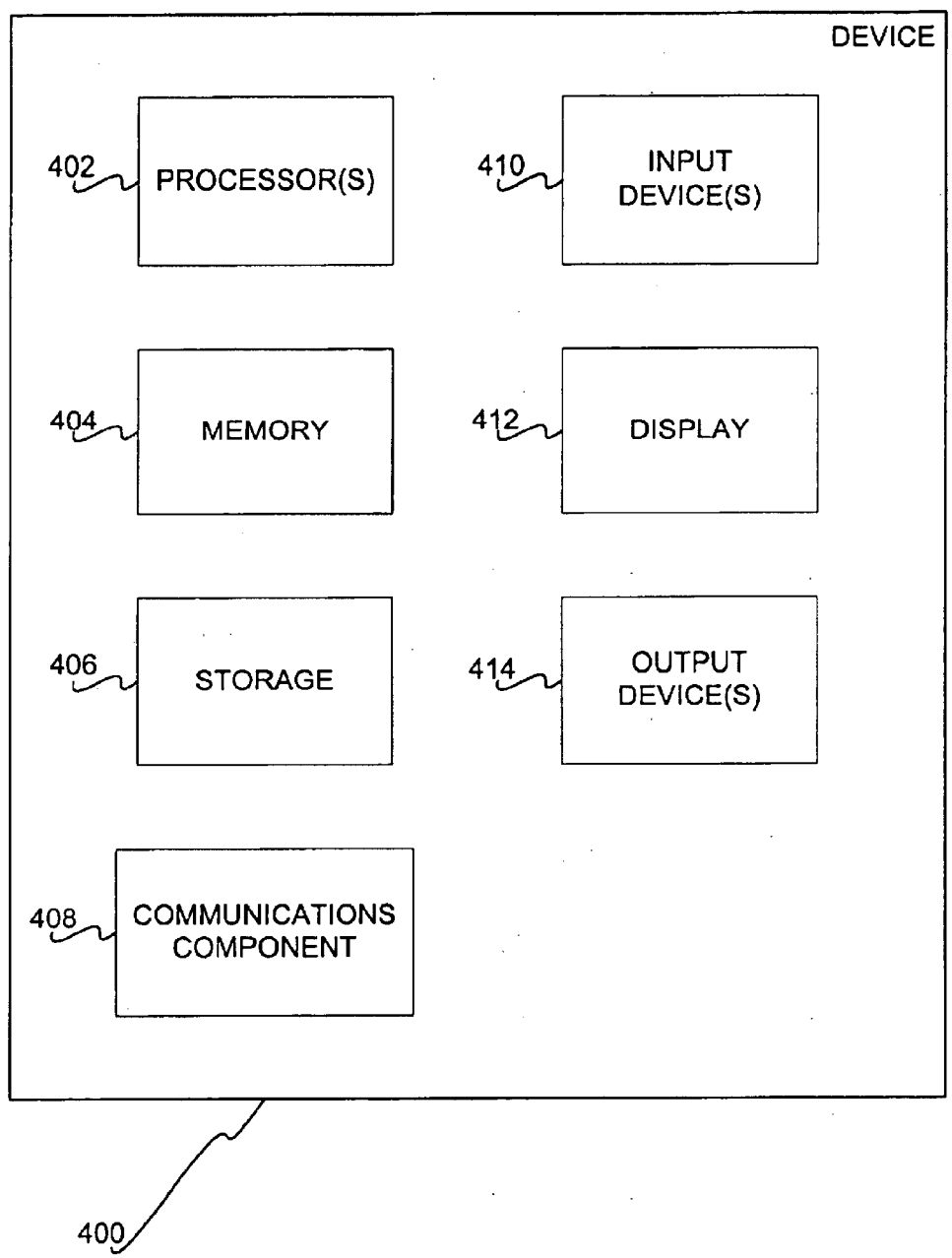

In FIG. 4, a diagram of an example computer or computerized device 400 in conjunction with which embodiments of the invention may be practiced is shown. The example computer or computerized device can be, for example, a desktop computer, a laptop computer, a personal digital assistant (PDA) device, a palm-size computer, a handheld computer, a cell phone, a simple, voice only phone etc.; the invention is not so limited. Those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network.

The device 400 includes one or more of the following components: processor(s) 402, memory 404, storage 406, a communications component 408, input device(s) 410, a display 412, and output device(s) 414. For a particular instantiation of the device 400, one or more of these components may not be present. The description of the device 400 is to be used as an overview as to the types of components that typically reside within such a device 400, and is not meant as a limiting or exhaustive description. The processor(s) 402 may include a single central-processing unit (CPU), or a plurality of processing units. The memory 404 may include read only memory (ROM) and/or random access memory (RAM). The storage 406 may be any type of storage, such as fixed-media storage devices such as hard disk drives, flash or other non-volatile memory, as well as removable-media storage devices, such as tape drives, optical drives like CD-ROM's, floppy disk drives, etc. Any type of computer-readable media which can store data that is accessible by a computer, such as magnetic cassettes, flash memory cards, digital video disks, Bernoulli cartridges, random access memories (RAMs), read only memories (ROMs), and the like, may be used.

Because the device 400 may operate in a network environment, such as the Internet, intranets, extranets, local-area networks (LAN's), wide-area networks (WAN's), etc., a communications component 408 can be present in or attached to the device 400. Such a component 408 may be one or more of a network card, such as an Ethernet card, an analog modem, a cable modem, a digital subscriber loop (DSL) modem, an Integrated Services Digital Network (ISDN) adapter, etc.; the invention is not so limited. Furthermore, the input device(s) 410 are the mechanisms by which a user indicates input to the device 400. Such device(s) 410 include keyboards, pointing devices, microphones, joysticks, game pads, satellite dishes, scanners, etc. The display 412 is how the device 400 typically shows output to the user, and can include, for example, cathode-ray tube (CRT) display devices, flat-panel display (FPD) display devices, etc. In addition, the device 400 may indicate output to the user via other output device(s) 414, such as speakers, printers, etc. It is noted that the combination of input devices, output devices, displays, etc., of the device 400 constitutes the user interface media, or simply the media, of the device 400.

In embodiments of the invention relating to methods, the methods can be computer-implemented. A computer-implemented method is desirably realized at least in part as one or more programs running on a computer—that is, as a program executed from a computer or machine-readable medium such as a memory by a processor of a computer. The programs are desirably storable on a machine-readable medium such as a floppy disk or a CD-ROM, for distribution and installation and execution on another if computer. The program or programs can be a part of a computer system or a computer. The invention is not so limited, however.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A method of adding new functions to an operating system on a computer, the operating system having an application programming interface (API) table stored in protected memory of the computer and the API table having pointers to existing functions also stored in protected memory of the computer, the method comprising:

providing a first hooker component in unprotected memory and a second hooker component in protected memory, the first hooker component adapted to modify the API table to include one or more pointers to new functions;

receiving, by the second hooker component, a request from the first hooker component to replace the API table with a replacement API table, the replacement API table having pointers to new functions;

validating, by the second hooker component, the request;

sending, by the second hooker component, a copy of the API table to the first hooker component;

receiving, by the second hooker component, the replacement API table from the first hooker component; and using, by the operating system, the replacement API table.

2. The method of claim 1, wherein the first hooker component and the new functions are part of an application program that requires the operating system to use the new functions.

3. The method of claim 2 wherein validating comprises:

verifying, by the second hooker component, that the application has permission to replace the API table.

4. The method of claim 1 further comprising:

creating, by the first hooker component, the replacement API table by modifying the API table to include the pointers to the new functions.

5. The method of claim 1 further comprising:

receiving, by the second hooker component, an unregister request to unregister the replacement API table; and using, by the operating system, the API table.

6. The method of claim 4 wherein creating the replacement API table comprises:

replacing pointers in the API table with pointers to new functions.

7. The method of claim 4 wherein creating the replacement API table comprises:

including, in addition to the pointers in the API table, pointers to new functions.

8. The method of claim 1 further comprising:

deleting the API table; and storing the replacement API table.

9. The method of claim 2 wherein providing the first hooking component comprises:

installing, by the operating system, the application on the computer.

* * * * *